US012585179B2

(12) United States Patent
Takagi

(10) Patent No.: US 12,585,179 B2
(45) Date of Patent: Mar. 24, 2026

(54) WAVELENGTH CONVERSION APPARATUS, LIGHT SOURCE APPARATUS, AND PROJECTOR

(71) Applicant: SEIKO EPSON CORPORATION, Tokyo (JP)

(72) Inventor: Kunihiko Takagi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 359 days.

(21) Appl. No.: 18/343,206

(22) Filed: Jun. 28, 2023

(65) Prior Publication Data

US 2023/0418144 A1 Dec. 28, 2023

(30) Foreign Application Priority Data

Jun. 28, 2022 (JP) .................................. 2022-103297

(51) Int. Cl.
G03B 21/20 (2006.01)
H04N 9/31 (2006.01)
(52) U.S. Cl.
CPC ....... *G03B 21/204* (2013.01); *G03B 21/2013* (2013.01); *G03B 21/2066* (2013.01); *G03B 21/2073* (2013.01); *G03B 21/208* (2013.01); *H04N 9/3161* (2013.01); *H04N 9/3164* (2013.01)
(58) Field of Classification Search
CPC .............. G03B 21/204; G03B 21/2013; G03B 21/2066; G03B 21/2073; G03B 21/208; H04N 9/3161; H04N 9/3164
USPC .......................................................... 353/31
See application file for complete search history.

(56) References Cited

U.S. PATENT DOCUMENTS

2010/0110660 A1* 5/2010 Brukilacchio ....... B60Q 1/2611
362/231
2016/0182869 A1 6/2016 Fukano
(Continued)

FOREIGN PATENT DOCUMENTS

CN 216521488 U * 5/2022
JP 2014119670 A * 6/2014
JP 2016-118653 A 6/2016
(Continued)

OTHER PUBLICATIONS

Translation of CN_216521488 (Year: 2025).*
Translation of JP_2014119670 (Year: 2025).*

*Primary Examiner* — Jerry L Brooks
(74) *Attorney, Agent, or Firm* — Dority & Manning, P.A.

(57) ABSTRACT

A wavelength conversion apparatus according to an aspect of the present disclosure includes a wavelength converter that converts first light emitted from a light source and having a first wavelength band into second light having a second wavelength band different from the first wavelength band, a base to which the wavelength converter is fixed, a light collector that causes the first light emitted from the light source to enter the wavelength converter, a holding part that holds the light collector, a rotary driver that rotates the holding part around an axis of rotation, and a support part that is fixed to the base and rotatably supports the holding part, the optical axis of the light collector is separated from the axis of rotation of the holding part, the optical axis of rotation of the holding part is parallel to the axis of rotation of the holding part.

8 Claims, 10 Drawing Sheets

(56)     References Cited

U.S. PATENT DOCUMENTS

2018/0073716  A1     3/2018   Takada et al.
2018/0292740  A1     10/2018  Takagi

FOREIGN PATENT DOCUMENTS

JP     2016-189440  A     11/2016
JP     2018-180107  A     11/2018
JP     2018-190664  A     11/2018

* cited by examiner

WAVELENGTH CONVERSION APPARATUS, LIGHT SOURCE APPARATUS, AND PROJECTOR

The present application is based on, and claims priority from JP Application Serial Number 2022-103297, filed Jun. 28, 2022, the disclosure of which is hereby incorporated by reference herein in its entirety.

BACKGROUND

1. Technical Field

The present disclosure relates to a wavelength conversion apparatus, a light source apparatus, and a projector.

2. Related Art

As a light source apparatus for projectors, there is a known light source apparatus including a laser light source and a phosphor (see JP-A-2018-180107 and JP-A-2018-190664, for example).

The light source apparatus described in JP-A-2018-180107 includes a phosphor layer, a substrate that supports the phosphor layer, and a support part that is thermally coupled to the substrate. In the light source apparatus, the substrate has a support surface that supports the phosphor layer, and part of the support surface is thermally coupled to the support part, so that heat of the phosphor layer is dissipated via the substrate and the support part.

In the light source apparatus described in JP-A-2018-180107, since excitation light keeps being incident on the same location at the phosphor layer, the position where the excitation light is incident is heated to a high temperature. When the temperature of the phosphor layer rises, the efficiency of the conversion from the excitation light to fluorescence in the phosphor layer lowers in some cases.

In contrast, the light source apparatus described in JP-A-2018-190664, in which the angle of a plate-shaped optical part on which excitation light is incident is changed, or a light collection system that collects the excitation light at a phosphor layer is moved, changes the position where the excitation light is collected at the phosphor layer. The configuration described above suppresses continuous incidence of the excitation light incident on the same location at the phosphor layer.

In the light source apparatus described in JP-A-2018-190664, the optical path of the excitation light is changed by causing the light collection system to make reciprocating motion in a direction perpendicular to the optical axis of the light collection system. The reciprocating motion of the light collection system, however, has a problem of incident of the excitation light on the same location at the phosphor layer because the movement speed of the light collection system becomes zero at the timing when the movement direction is changed.

SUMMARY

To solve the problems described above, according to an aspect of the present disclosure, there is provided a wavelength conversion apparatus including a wavelength converter that converts first light that is incident from a light source and belongs to a first wavelength band into second light that belongs to a second wavelength band different from the first wavelength band, a base to which the wavelength converter is fixed, a light collector that causes the first light to enter the wavelength converter, a holding part that holds the light collector, a rotary driver that rotates the holding part around an axis of rotation, and a support part that is fixed to the base and rotatably supports the holding part, and an optical axis of the light collector and the axis of rotation of the holding part are separate from each other and parallel to each other.

According to another aspect of the present disclosure, there is provided a light source apparatus including the wavelength conversion apparatus according to the aspect described above, and a light source that emits the first light.

According to another aspect of the present disclosure, there is provided a projector including the light source apparatus according to the aspect described above, a light modulator that modulates light from the light source apparatus, and a projection optical apparatus that projects the light modulated by the light modulator.

BRIEF DESCRIPTION OF THE DRAWINGS

FIG. 3 is a perspective view showing the configuration of a wavelength conversion apparatus.

DESCRIPTION OF EXEMPLARY EMBODIMENTS

First Embodiment

Figure 1:
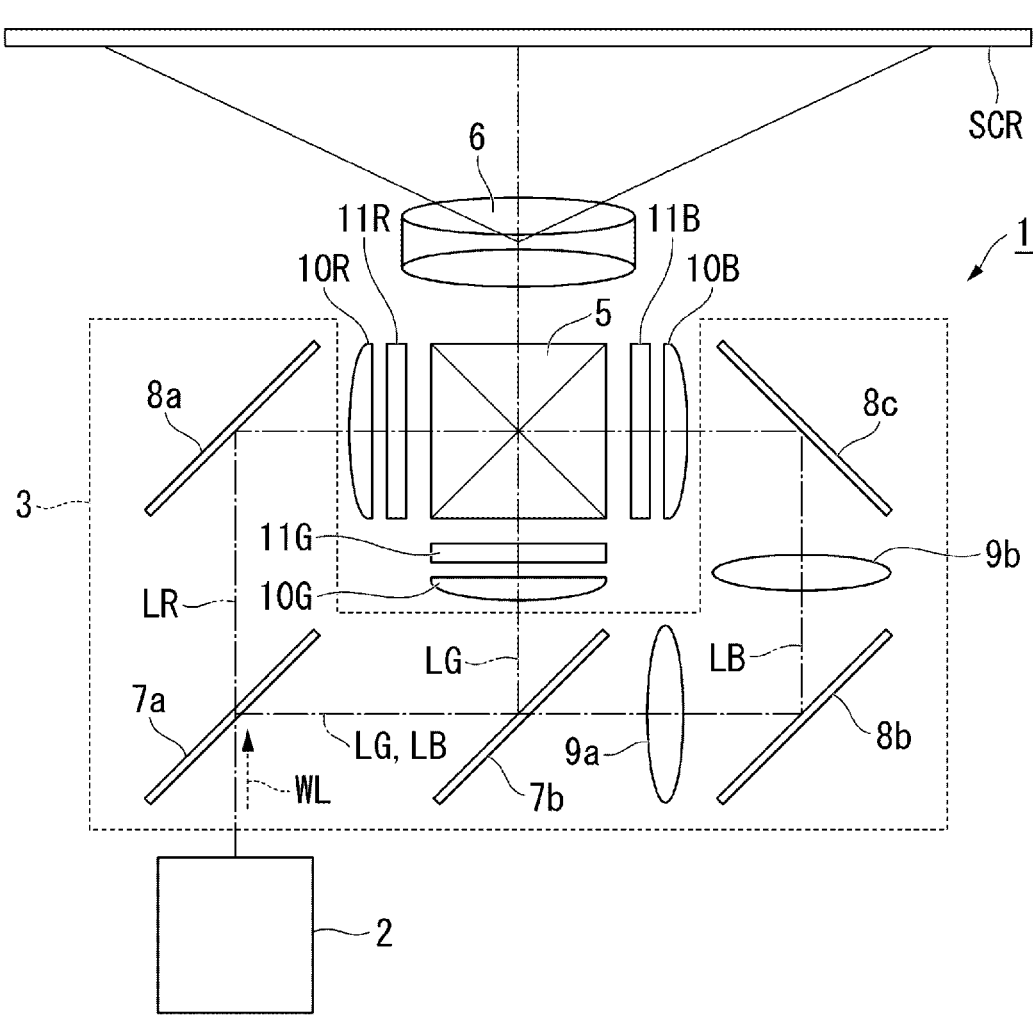
FIG. 1 shows a schematic configuration of a projector according to a first embodiment.

An embodiment of the present disclosure will be described below in detail with reference to the drawings. In the drawings used in the description below, a characteristic portion is enlarged for convenience in some cases for clarity of the characteristic thereof, and the dimension ratio and other factors of each component are therefore not always equal to actual values.

Configuration of Projector

An example of a projector according to the present embodiment will be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a light source apparatus 2, a color separation system 3, light modulators 11R, 11G, and 11B, a light combining system 5, and a projection optical apparatus 6.

The color separation system 3 separates illumination light WL into red light LR, green light LG, and blue light LB. The color separation system 3 generally includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source apparatus 2 into the one light including the red light LR and the other light including the green light LG and blue light LB. The first dichroic mirror 7a separates the illumination light WL from the light source apparatus 2 into the red light LR, the green light LG, and blue light LB. The first dichroic mirror 7a transmits the red light LR and reflects the green light LG and blue light LB. On the other hand, the second dichroic mirror 7b reflects the green light LG and transmits the blue light LB to separate the green light LG and the blue light LB.

The first total reflection mirror 8a is disposed in the optical path of the red light LR and reflects the red light LR having passed through the first dichroic mirror 7a toward the light modulator 11R. On the other hand, the second total reflection mirror 8b and the third total reflection mirror 8c are disposed in the optical path of the blue light LB and guide the blue light LB having passed through the second dichroic mirror 7b to the light modulator 11B. The green light LG is reflected off the second dichroic mirror 7b toward the light modulator 11G.

The first relay lens 9a and the second relay lens 9b are disposed downstream from the second dichroic mirror 7b in the optical path of the blue light LB.

The light modulator 11R modulates the red light LR in accordance with image information to form image light corresponding to the red light LR. The light modulator 11G modulates the green light LG in accordance with image information to form image light corresponding to the green light LG. The light modulator 11B modulates the blue light LB in accordance with image information to form image light corresponding to the blue light LB.

The light modulators 11R, 11G, and 11B are each, for example, a transmissive liquid crystal panel. Polarizers that are not shown are disposed on the light incident side and the light exiting side of each of the liquid crystal panels.

Field lenses 10R, 10G, and 10B are disposed at the light incident side of the light modulators 11R, 11G, and 11B, respectively. The field lenses 10R, 10G, and 10B parallelize the red light LR, the green light LG, and the blue light LB to be incident on the respective light modulators 11R, 11G, and 11B.

The light combining system 5 receives the image light from the light modulator 11R, the image light from the light modulator 11G, and the image light from the light modulator 11B. The light combining system 5 combines the image light corresponding to the red light LR, the image light corresponding to the green light LG, and the image light corresponding to the blue light LB with one another and outputs the combined image light toward the projection optical apparatus 6. The light combining system 5 is formed, for example, of a cross dichroic prism.

The projection optical apparatus 6 is formed of a projection lens group, enlarges the combined image light from the light combining system 5, and projects the enlarged image light toward the screen SCR. Enlarged color video images are thus displayed on the screen SCR.

Configuration of Light Source Apparatus

The light source apparatus 2 according to the present embodiment will be subsequently described. In the drawings described below, each configuration of the light source apparatus 2 will be described by using an XYZ coordinate system as required. The axis Z is an axis parallel to an illumination optical axis ax2 of the light source apparatus 2, the axis X is an axis perpendicular to the illumination optical axis ax2 and parallel to an optical axis ax1 of the light source apparatus 2, and the axis Y is an axis perpendicular to the axes X and Z.

Figure 2:
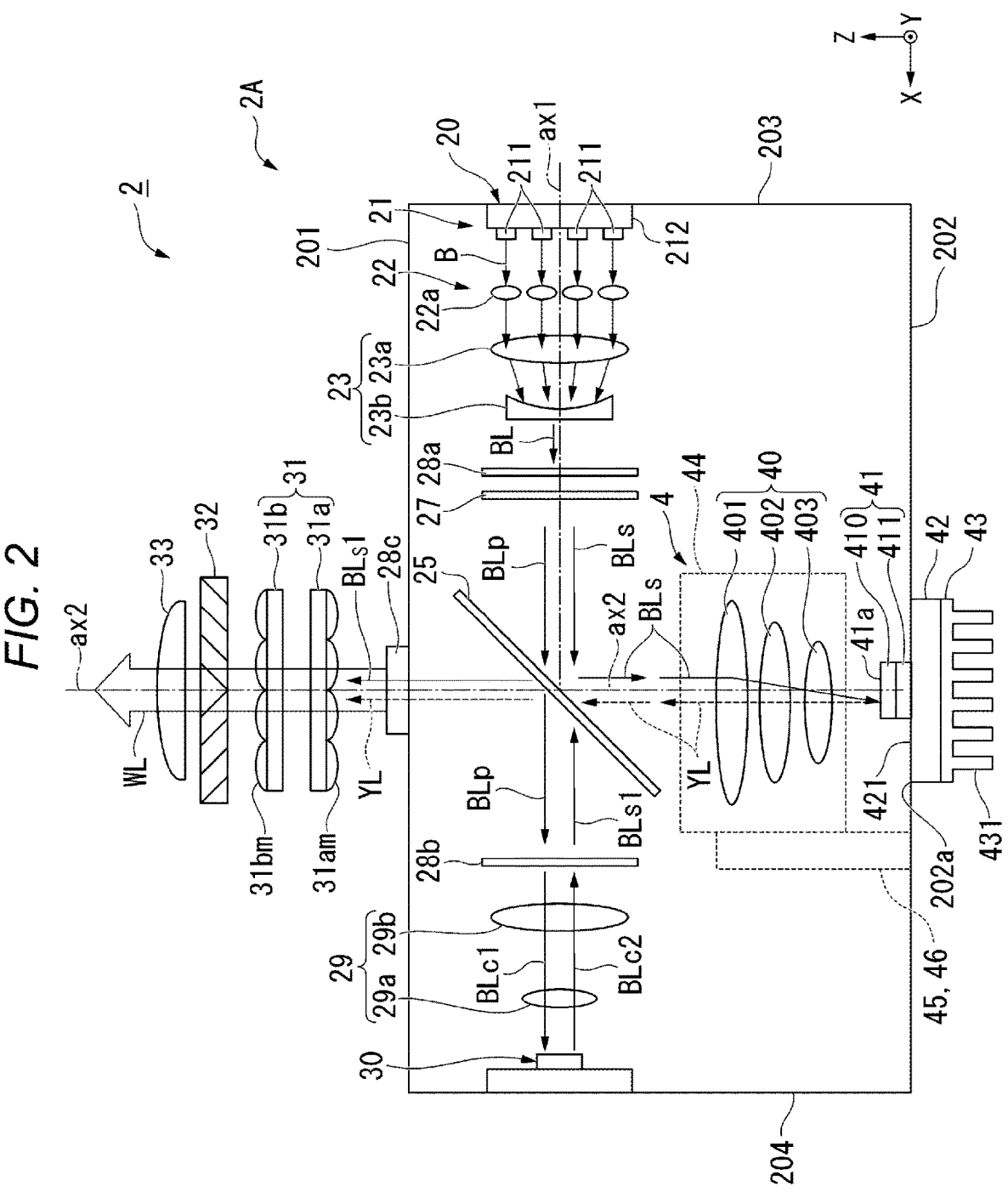
FIG. 2 shows a schematic configuration of a light source apparatus.

FIG. 2 shows a schematic configuration of the light source apparatus 2. The light source apparatus 2 includes a light source section 2A, an optical integration system 31, a polarization converter 32, and a superimposing lens 33, as shown in FIG. 2.

The light source section 2A includes a light source enclosure 20, a light source 21, a collimator system 22, an afocal system 23, a first phase retarder 28a, a diffusive transmissive element 27, a light separator 25, a wavelength conversion apparatus 4, a second phase retarder 28b, a light collection system 29, a diffusive reflector 30, and a third phase retarder 28c.

The light source enclosure 20 is an enclosure that dust is unlikely to enter and is formed in a substantially box-like shape. The light source enclosure 20 has a first side plate 201, a second side plate 202, a third side plate 203, and a fourth side plate 204. In addition to the side plates, the light source enclosure 20 has, although not shown, a top plate coupled to ends of the first side plate 201, the second side plate 202, the third side plate 203, and the fourth side plate 204 that are the ends facing the positive end of the direction Y, and a bottom plate coupled to ends of the four plates that are the ends facing the negative end of the direction Y.

The first side plate 201 is disposed at the side facing the positive end of the direction Z, which is the side of the light source enclosure 20 via which the illumination light WL exits. The first side plate 201 has an exit port via which the illumination light WL exits.

The second side plate 202 is the plate opposite from the first side plate 201 and is disposed at a position shifted from the first side plate 201 toward the negative end of the direction Z.

The following axes are set in the light source enclosure 20: the optical axis ax1 of the light source 21 extending along the axis X; and the illumination optical axis ax2 extending along the axis Z. That is, the optical axis ax1 and the illumination optical axis ax2 intersect with each other. The optical components that form the light source apparatus 2 are disposed along the optical axis ax1 or the illumination optical axis ax2.

Specifically, the light source 21, the collimator system 22, the afocal system 23, the first phase retarder 28a, the light separator 25, the second phase retarder 28b, the light collection system 29, and the diffusive reflector 30 are sequentially arranged along the optical axis ax1 of the light source 21.

The wavelength conversion apparatus 4, the light separator 25, the third phase retarder 28c, the optical integration system 31, the polarization converter 32, and the superimposing lens 33 are sequentially arranged along the illumination optical axis ax2 of the light source apparatus 2. The optical axis ax1 and the illumination optical axis ax2 are present in the same plane and perpendicular to each other.

The light separator 25 is disposed at the intersection of the optical axis ax1 and the illumination optical axis ax2.

The light source 21 is fixed to the third side plate 203 of the light source enclosure 20 and emits light along the optical axis ax1 toward the positive end of the direction X.

The light source 21 includes a plurality of semiconductor lasers 211 each as a solid-state light source, and a light source support substrate 212. The plurality of semiconductor lasers 211 are arranged in an array in a plane perpendicular to the optical axis ax1. The light source support substrate 212 supports the semiconductor lasers 211 and is fixed to the third side plate 203. The light source support substrate 212 is made, for example, of metal so that heat of the semiconductor lasers 211 is likely to be transmitted to the light source enclosure 20.

The semiconductor lasers 211 each emits, for example, a beam B, which belongs to a blue wavelength band (first wavelength band) having a peak wavelength of 460 nm, at which the light intensity peaks. Based on the configuration described above, the light source 21 in the present embodiment emits a blue luminous flux BL, which is first light formed of the plurality of beams B. The blue luminous flux BL emitted from the light source 21 enters the collimator system 22.

Configuration of Collimator System

The collimator system 22 converts the blue luminous flux BL emitted from the light source 21 into parallelized light. The collimator system 22 is formed, for example, of a plurality of collimator lenses 22a arranged in an array. The plurality of collimator lenses 22a are arranged in correspondence with the plurality of semiconductor lasers 211. The blue luminous flux BL having passed through the collimator system 22 enters the afocal system 23.

Configuration of Afocal System

The afocal system 23 adjusts the luminous flux diameter of the blue luminous flux BL. The afocal system 23 is formed, for example, of a convex lens 23a and a concave lens 23b. The blue luminous flux BL having passed through the afocal system 23 enters the first phase retarder 28a.

Configuration of First Phase Retarder

The first phase retarder 28a is, for example, a half wave plate configured to be rotatable. The blue luminous flux BL emitted from the semiconductor lasers 211 is linearly polarized light. Appropriately setting the angle of rotation of the first phase retarder 28a allows the blue luminous flux BL passing through the first phase retarder 28a to be converted into beams containing an S-polarized component and a P-polarized component with respect to the light separator 25 mixed with each other at a predetermined ratio. The ratio between the S-polarized component and the P-polarized component can be changed by rotating the first phase retarder 28a.

The blue luminous flux BL containing beams BLs formed of the S-polarized component and beams BLp formed of the P-polarized component and generated when passing through the first phase retarder 28a enters the diffusive transmissive element 27.

Configuration of Diffusive Transmissive Element

The diffusive transmissive element 27 is disposed in a position shifted from the first phase retarder 28a toward the positive side of the direction X and homogenizes the illuminance distributions of the beams BLs and BLp incident from the first phase retarder 28a. The diffusive transmissive element 27 can, for example, have a configuration including a hologram, a configuration in which a plurality of lenslets are arranged in a plane perpendicular to the optical axis, or a configuration in which a light passage surface is a rough surface.

The diffusive transmissive element 27 may be replaced with a homogenizer optical element including a pair of multi-lenses.

The blue luminous flux BL having passed through the diffusive transmissive element 27 is incident on the light separator 25.

Configuration of Light Separator

The light separator 25 is formed, for example, of a polarization beam splitter having wavelength selectivity. The light separator 25 inclines by 45° with respect to each of the optical axis ax1 and the illumination optical axis ax2.

The light separator 25 has a polarization separation function of separating the blue luminous flux BL into the beams BLs, which are formed of the S-polarized component with respect to the light separator 25, and the beams BLp, which are formed of the P-polarized component with respect to the light separator 25. Specifically, the light separator 25 reflects the beams BLs, which are formed of the S-polarized component, and transmits the beams BLp, which are formed of the P-polarized component.

The light separator 25 further has a color separation function of transmitting a fluorescence YL, which belongs to a wavelength band different from that of the blue luminous flux BL, irrespective of the polarization state of the fluorescence YL.

The light separator 25 may instead have the function of a half-silvered mirror that transmits part of the light incident from the diffusive transmissive element 27 and reflects the remaining light and the function of a dichroic mirror that reflects blue light BLs1 incident from the second phase retarder 28b and transmits the fluorescence YL incident from the wavelength conversion apparatus 4. In this case, the first phase retarder 28a and the second phase retarder 28b can be omitted.

The S-polarized beams BLs having exited out of the light separator 25 enter the wavelength conversion apparatus 4. The wavelength conversion apparatus 4 converts the beams BLs, which belong to the blue wavelength band, into the fluorescence YL, which belongs to a yellow wavelength band different from the blue wavelength band. The fluorescence YL emitted from the wavelength conversion apparatus 4 passes through the light separator 25. The configuration of the wavelength conversion apparatus 4 will be described later.

On the other hand, the P-polarized beams BLp having exited out of the light separator 25 enter the second phase retarder 28b.

Configuration of Second Phase Retarder

The second phase retarder 28b is formed of a quarter wave plate disposed in the optical path between the light separator 25 and the diffusive reflector 30. The P-polarized beams BLp having exited out of the light separator 25 are therefore converted by the second phase retarder 28b, for example, into right-handed circularly polarized blue light BLc1, which then enters the light collection system 29.

The light collection system 29 is formed, for example, of convex lenses 29a and 29b and causes the blue light BLc1 to be incident in the form of a collected spot on the diffusive reflector 30.

Configuration of Diffusive Reflector

The diffusive reflector 30 is fixed to the fourth side plate 204 of the light source enclosure 20. The diffusive reflector 30 and the wavelength conversion apparatus 4 are disposed on opposite sides of the light separator 25, and the diffusive reflector 30 diffusively reflects the blue light BLc1 having exited out of the light collection system 29 toward the light separator 25. The diffusive reflector 30 is a reflective diffuser that reflects the blue light BLc1 in the Lambertian reflection scheme but does not disturb the polarization state thereof.

The light diffusively reflected off the diffusive reflector 30 is hereinafter referred to as blue light BLc2. According to the present embodiment, the diffusively reflected blue light BLc1 forms the blue light BLc2 having a substantially uniform illuminance distribution. For example, the right-handed circularly polarized blue light BLc1 is reflected in the form of left-handed circularly polarized blue light BLc2.

The blue light BLc2 is converted by the light collection system 29 into parallelized light, which then enters the second phase retarder 28b again. The left-handed circularly polarized blue light BLc2 is converted by the second phase retarder 28b into S-polarization blue light BLs1. The S-polarized blue light BLs1 is reflected off the light separator 25 toward the third phase retarder 28c. That is, the blue light BLs1 and the fluorescence YL exit out of the light separator 25 in the same direction and enter the third phase retarder 28c.

Configuration of Third Phase Retarder

The third phase retarder 28c is disposed in a position shifted from the light separator 25 toward the positive end of the direction Z, and converts the blue light BLs1 and the fluorescence YL incident from the light separator 25 into light that is a mixture of S-polarized light and P-polarized light. The third phase retarder 28c is provided at the light exiting port of the first side plate 201 of the light source enclosure 20. The white light as a result of the conversion performed by the third phase retarder 28c exits as the illumination light WL to the optical integration system 31. The light that exits out of the light source section 2A in the present embodiment toward the optical integration system 31 is the illumination light WL, which is a mixture of the blue light BLs1 and the fluorescence YL.

Configuration of Optical Integration System

The optical integration system 31 is formed, for example, of a first multi-lens array 31a and a second multi-lens array 31b.

The first multi-lens array 31a includes a plurality of first lenses 31am, which divide the illumination light WL into a plurality of sub-luminous fluxes.

The lens surface of the first multi-lens array 31a, that is, the surfaces of the first lenses 31am are conjugate with an image formation region of each of the light modulators 11R, 11G, and 11B. Therefore, when viewed in the direction of the illumination optical axis ax2, the first lenses 31am each have a rectangular shape substantially similar to the shape of the image formation region of each of the light modulators 11R, 11G, and 11B. The sub-luminous fluxes having exited out of the first multi-lens array 31a are thus each efficiently incident on the image formation region of each of the light modulators 11R, 11G, and 11B.

The second multi-lens array 31b includes a plurality of second lenses 31bm corresponding to the plurality of first lenses 31am of the first multi-lens array 31a. The second multi-lens array 31b along with the superimposing lens 33 brings images of the first lenses 31am of the first multi-lens array 31a into focus in the vicinity of the image formation region of each of the light modulators 11R, 11G, and 11B. The illumination light WL having passed through the optical integration system 31 enters the polarization converter 32.

Configuration of Polarization Converter

The polarization converter 32 has a configuration in which polarization separation films and retardation films that are not shown are arranged in an array. The polarization converter 32 aligns the polarization directions of the illumination light WL with a predetermined direction. Specifically, the polarization converter 32 aligns the polarization directions of the illumination light WL with the direction of the transmission axis of the light-incident-side polarizers for the light modulators 11R, 11G, and 11B.

The polarization directions of the red light LR, the green light LG, and the blue light LB separated from the illumination light WL having passed through the polarization converter 32 coincide with the transmission axis direction of the light-incident-side polarizers for the light modulators 11R, 11G, and 11B. The red light LR, the green light LG, and the blue light LB are therefore incident on the image formation regions of the light modulators 11R, 11G, and 11B, respectively, without being blocked by the light-incident-side polarizers. The illumination light WL having passed through the polarization converter 32 enters the superimposing lens 33.

Configuration of Superimposing Lens

The superimposing lens 33, in cooperation with the optical integration system 31, homogenizes the illuminance distribution in the image formation region of each of the light modulators 11R, 11G, and 11B, which are illumination receiving regions.

Wavelength Conversion Apparatus

The configuration of the wavelength conversion apparatus 4 will subsequently be described.

The wavelength conversion apparatus 4 includes a light collector 40, a wavelength converter 41, a substrate 42, and a heat dissipation part 43, which are sequentially arranged from the side facing the light separator 25, and further includes a holding part 44, a rotary driver 45, and a support part 46. The substrate 42 is part of the second side plate 202 of the light source enclosure 20. The substrate 42 closes an opening 202a provided in the second side plate 202.

The light collector 40 causes the beams BLs to be incident in the form of a collected spot on the wavelength converter 41. That is, the light collector 40 is disposed at a position shifted from the wavelength converter 41 toward the positive end of the direction Z, which faces the side on which the beams BLs is incident.

The light collector 40 includes a first lens 401, a second lens 402, and a third lens 403, which are arranged from the side facing the positive end of the direction Z toward the side facing the negative end of the direction Z. The number of lenses that form the light collector 40 is not limited to three, and may instead be one or two, or four or more.

The wavelength converter 41 converts the first light that is emitted from the light source 21 and belongs to the first wavelength band into second light that belongs to a second wavelength band different from the first wavelength band. That is, the wavelength converter 41 receives as the first light the beams BLs, which are emitted from the light source 21, are separated from the blue luminous flux BL by the light separator 25, and belong to the blue wavelength band, which is the first wavelength band, and converts the beams BLs into the fluorescence YL, which belongs to the yellow wavelength band, which is the second wavelength band different from the blue wavelength band. The wavelength converter 41 includes a wavelength conversion layer 410 and a reflection layer 411.

The wavelength conversion layer 410 contains, for example, an yttrium-aluminum-garnet-based (YAG-based) phosphor. Consider YAG:Ce, which contains cerium (Ce) as an activator, by way of example, and the wavelength conversion layer 410 can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method. When a porous sintered element is used as the wavelength conversion layer 410, light is diffused inside the phosphor so that the light is unlikely to propagate laterally, which is desirable also in regard of light utilization efficiency. The wavelength band to which the fluorescence YL belongs has a peak wavelength ranging, for example, from 500 to 680 nm, at which the light intensity peaks. That is, the fluorescence YL is yellow light containing a green light component and a red light component.

The reflection layer 411 is provided on the side of the wavelength conversion layer 410 opposite from the side on which the beams BLs are incident. That is, the reflection layer 411 is provided in a position shifted from the wavelength conversion layer 410 toward the positive end of the direction −Z. The reflection layer 411 reflects the fluorescence YL incident from the wavelength conversion layer 410 toward the positive end of the direction Z. The reflection layer 411 is formed, for example, of a laminated film including a dielectric multilayer film, a metal mirror, an enhanced reflection film, and other films.

The wavelength converter 41 has a light incident surface 41a, which outputs the fluorescence YL, into which the incident beams BLs have been converted. The light incident surface 41a is the surface of the wavelength conversion layer 410 that faces the positive end of the direction Z. The wavelength converter 41 in the present embodiment is a reflective wavelength converter that causes the fluorescence YL to exit toward the side on which the beams BLs, which form excitation light, are incident.

The wavelength converter 41 is fixed to the substrate 42, which is part of the second side plate 202. The substrate 42 has a support surface 421, to which the wavelength converter 41 is fixed. In the present embodiment, the second side plate 202 including the substrate 42 corresponds to a base to which the wavelength converter 41 is fixed.

The substrate 42 positions the wavelength converter 41, which is disposed on the support surface 421, in the light source enclosure 20 through the opening 202a provided in the second side plate 202 of the light source enclosure 20. The wavelength converter 41 may be directly fixed to the second side plate 202 of the light source enclosure 20.

The heat dissipation part 43 dissipates heat generated by the wavelength converter 41. The heat dissipation part 43 is made of a metal or any other material that excels in thermal conductivity. The heat dissipation part 43 includes a plurality of heat dissipation fins 431, and a cooler causes a cooling gas to flow through the gaps between the plurality of heat dissipation fins 431. The plurality of heat dissipation fins 431 dissipate the heat of the wavelength converter 41 by transmitting the heat of the wavelength converter 41 to the cooling gas.

The configuration of the wavelength conversion apparatus 4 will be subsequently described in detail.

Figure 3:
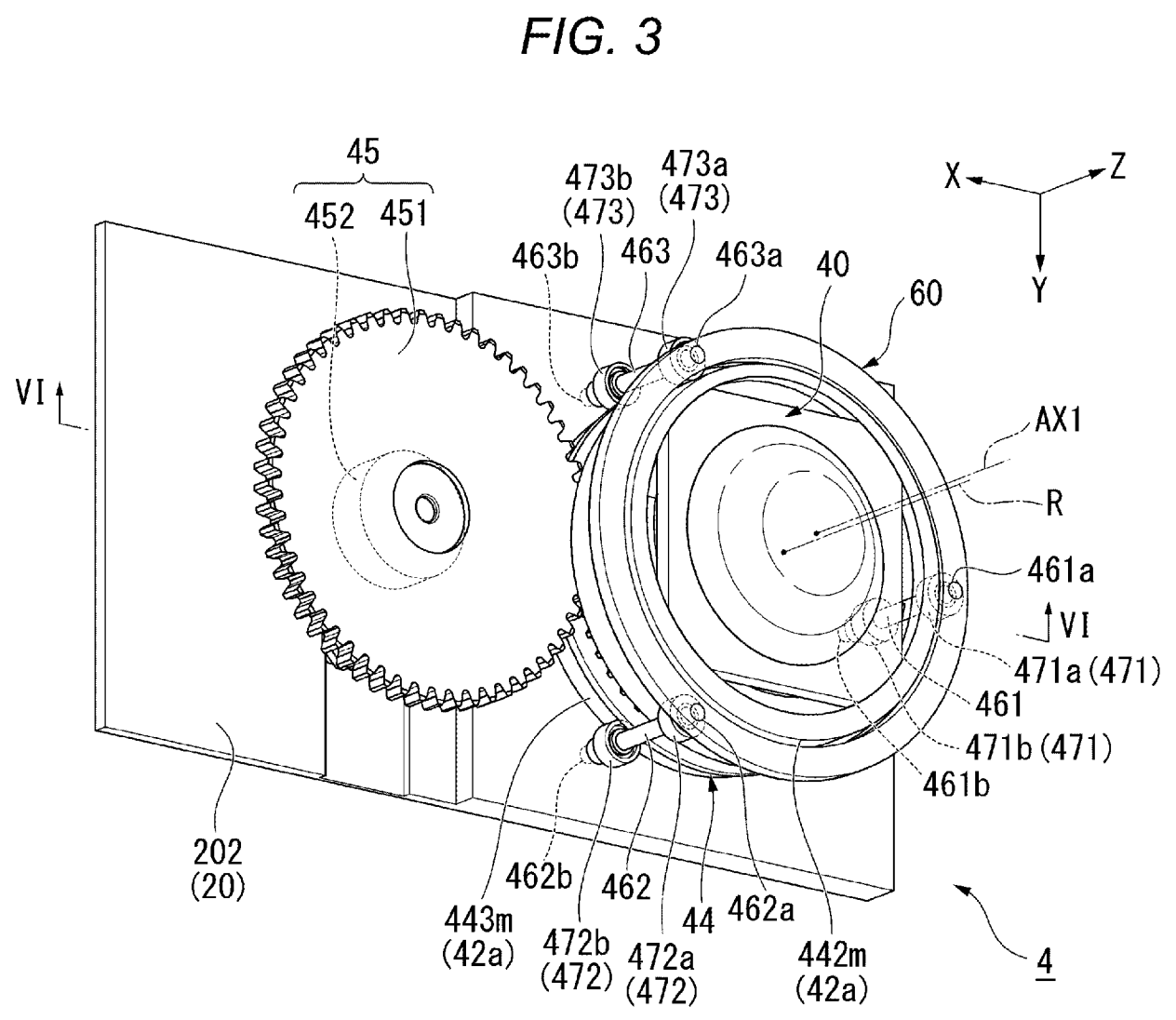
Figure 4:
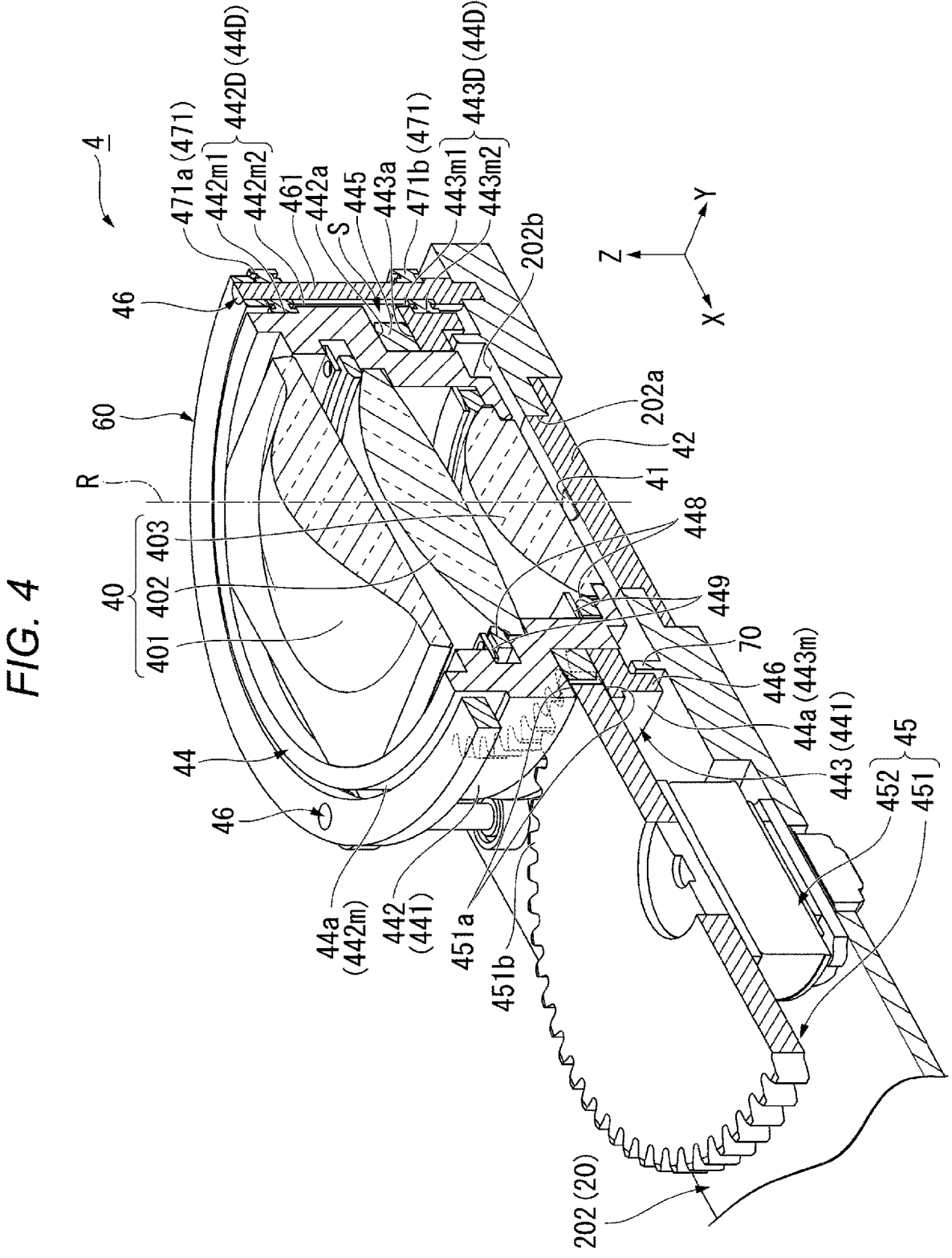
FIG. 4 is a cross-sectional view taken along the line VI-VI in FIG. 3.

FIG. 3 is a perspective view showing the configuration of the wavelength conversion apparatus 4. FIG. 4 is a cross-sectional view showing the configuration of key parts of the wavelength conversion apparatus 4. FIG. 4 is a cross-sectional view taken along the line VI-VI in FIG. 3.

In the wavelength conversion apparatus 4 according to the present embodiment, the light collector 40 is held by the holding part 44, as shown in FIG. 3. The holding part 44 rotates around an axis of rotation R, which extends along the axis Z. The axis of rotation R is an imaginary line passing through the center of the holding part 44. In the description below, the axial direction of the axis of rotation R, that is, the direction parallel to the axis Z is simply called an "axial direction", the radial direction extending from the axis of rotation R is simply called a "radial direction", and the circumferential direction around the axis of rotation R is simply called a "circumferential direction.

The holding part 44 includes a body section 441, which houses the light collector 40, and a first gear 445 provided in the body section 441, as shown in FIG. 4. The body section 441 includes a first portion 442 and a second portion 443. The holding part 44 rotates around the axis of rotation R when a rotary drive force from the rotary driver 45 is transmitted to the holding part 44 via the first gear 445. The holding part 44 is rotatably supported by the support part 46, which will be described later. In the present embodiment, the light collector 40 along with the holding part 44 is rotatable around the axis of rotation R.

The first portion 442, the first gear 445, and the second portion 443 are arranged in the axial direction. The first portion 442 holds the light collector 40 in an appropriate position in the axial direction relative to the wavelength converter 41.

The first portion 442, for example, fixes the first lens 401 with an adhesive and holds the second lens 402 or the third lens 403 via an urging part 449 formed, for example, of a plate spring.

It is desirably to dispose a rubber part 448 between the urging part 449 and the second lens 402 or between the urging part 449 and the third lens 403. Occurrence of abnormal noise, wear, and other problems caused by direct contact between the urging part 449 and the lenses can thus be suppressed.

The first gear 445 has the shape of a ring and is fitted to the outer circumference of the first portion 442. The second portion 443 is disposed at a position shifted from the first gear 445 toward the negative end of the direction Z. The first gear 445 is sandwiched between the first portion 442 and the second portion 443 in the axial direction. The holding part 44 holds the first portion 442, the second portion 443, and the first gear 445 in such a way that these components are fixed to each other. Note that the first portion 442, the second portion 443, and the first gear 445 may be molded into a single piece.

The first portion 442, the second portion 443, and the first gear 445 are concentrically arranged around the axis of rotation R when viewed in the axial direction.

The first portion 442 and the second portion 443 each have a substantially tubular shape. The outer diameter of the first portion 442 and the outer diameter of the second portion 443 are approximately equal to each other. On the other hand, the diameter of the gear tooth top circle that defines the outer diameter of the first gear 445 is smaller than the outer diameters of the first portion 442 and the second portion 443. The first gear 445 is therefore recessed radially inward from an outer circumferential surface 44a of the holding part 44.

The tooth tops of the first gear 445 are located inside the outer circumferential surface 44a of the holding part 44 when viewed in the axial direction. An end surface 442a of the first portion 442, the end surface facing the negative end of the direction Z, and an end surface 443a of the second portion 443, the end surface facing the positive end of the direction Z, therefore face each other via a gap S.

The rotary driver 45 rotates the holding part 44 around the axis of rotation R by transmitting the driving force to the first gear 445. The rotary driver 45 is fixed to the second side plate 202 of the light source enclosure 20.

The rotary driver 45 includes a second gear 451 and a driver 452. The second gear 451 engages with the first gear 445 of the holding part 44. The driver 452 rotates the second gear 451. The driver 452 in the present embodiment is formed, for example, of a motor. The frequency of the rotation produced by the driver 452 can be set at any value, and frequencies higher than or equal to 60 Hz make image flicker to be unlikely to be recognized by a user.

The second gear 451 of the rotary driver 45 engages with the first gear 445 when inserted into the gap S described above in the holding part 44. Since the tooth tops of the second gear 451 are located radially inward from the outer circumferential surface 44a of the holding part 44, the second gear 451 is sandwiched between the end surface 442a of the first portion 442 and the end surface 443a of the second portion 443. That is, in the holding part 44, the end surface 442a of the first portion 442 and the end surface 443a of the second portion 443 face gear side surfaces 451a of the second gear 451. Note that the gear side surfaces 451a of the second gear 451 are surfaces that intersect with a tooth surface 451b, which engages with the first gear 445.

In the present embodiment, the body section 441 of the holding part 44 has the end surfaces 442a and 443a as facing surfaces that face the gear side surfaces 451a of the second gear 451.

In the wavelength conversion apparatus 4 according to the present embodiment, the second gear 451 engages with the first gear 445 with the gear side surfaces 451a facing the end surfaces 442a and 443a of the body section 441. The engaging section where the second gear 451 and the first gear 445 engage with each other is therefore covered with the body section 441, so that adhesion of dust and other foreign matter to the engaging section can be suppressed. Inserting the second gear 451 into the body section 441 restricts the position of the second gear 451 in the axial direction, whereby positional shift of the second gear 451 in the axial direction can be suppressed. The second gear 451 therefore engages with the first gear 445 in a stable manner, so that the drive power produced by the rotary driver 45 can be efficiently transmitted to the holding part 44.

The support part 46 includes a first pillar 461, a second pillar 462, a third pillar 463, a first rotary part 471, a second rotary part 472, a third rotary part 473, as shown in FIG. 3.

In the present embodiment, the first pillar 461, the second pillar 462, and the third pillar 463 are located at different positions in the circumferential direction and fixed to the second side plate 202 of the light source enclosure 20.

Specifically, the first pillar 461 has a first end section 461a, which faces the positive end of the direction Z or one end of the axial direction, and a second end section 461b, which faces the negative end of the direction Z or is the end section opposite from the first end section 461a. The first end section 461b of the first pillar 461 is fixed to the second side plate 202 of the light source enclosure 20.

The second pillar 462 has a third end section 462a, which faces the positive end of the direction Z or the one end of the axial direction, and a fourth end section 462b, which faces the negative end of the direction Z or is the end section opposite from the third end section 462a. The third end section 462b of the second pillar 462 is fixed to the second side plate 202 of the light source enclosure 20.

The third pillar 463 has a fifth end section 463a, which faces the positive end of the direction Z or the one end of the axial direction, and a sixth end section 463b, which faces the negative end of the direction Z or is the end section opposite from the fifth end section 463a. The fifth end section 463b of the third pillar 463 is fixed to the second side plate 202 of the light source enclosure 20.

The wavelength conversion apparatus 4 according to the present embodiment further includes a pillar fixing part 60, which fixes the first pillar 461, the second pillar 462, and the third pillar 463. The pillar fixing part 60 is formed of a ring-shaped plate and is disposed so as to surround the outer circumference of the holding part 44.

The pillar fixing part 60 fixes the first end section 461a of the first pillar 461, the third end section 462a of the second pillar 462, and the fifth end section 463a of the third pillar 463. The configuration described above allows one side of each of the first pillar 461, the second pillar 462, and the third pillar 463 in the axial direction, which is not fixed to the second side plate 202, to be fixed. That is, the first pillar 461, the second pillar 462, and the third pillar 463 have increased rigidity because the opposite ends thereof in the axial direction are each fixed. The pillars 461, 462, and 463 can therefore suppress axis runout that may occur when the holding part 44 rotates.

The pillar fixing part 60 may instead be formed of a plurality of parts as long as the three pillars can be fixed to each other. For example, the pillar fixing part 60 can be a combination of a first portion that fixes the first end section 461a and the third end section 462a to each other, a second portion that fixes the third end section 462a and the fifth end section 463a to each other, and a third portion that fixes the fifth end section 463a and the first end section 461a to each other.

The first rotary part 471 is provided on the first pillar 461, is in contact with the outer circumferential surface 44a of the holding part 44, and rotates around the first pillar 461 to rotatably support the holding part 44. The second rotary part 472 is provided on the second pillar 462, is in contact with the outer circumferential surface 44a of the holding part 44, and rotates around the second pillar 462 to rotatably support the holding part 44.

The third rotary part 473 is provided on the third pillar 463, is in contact with the outer circumferential surface 44a of the holding part 44, and rotates around the third pillar 463 to rotatably support the holding part 44.

The holding part 44 can smoothly rotate around the axis of rotation R while being supported by the pillars 461, 462, and 463 via the first rotary part 471, the second rotary part 472, and the third rotary part 473, respectively.

In the present embodiment, the outer circumferential surface 44a of the holding part 44 has an outer circumferential surface 442m of the first portion 442 and an outer circumferential surface 443m of the second portion 443 (see FIG. 4).

In the present embodiment, the first rotary part 471 is formed, for example, of a pair of ball bearings 471a and 471b, the second rotary part 472 is formed, for example, of a pair of ball bearings 472a and 472b, and the third rotary part 473 is formed, for example, of a pair of ball bearings 473a and 473b, as shown in FIG. 3.

Look at the first rotary part 471 by way of example, and the ball bearing 471a, which is one of the ball bearings, is provided at the side of the first pillar 461 facing the positive end of the direction Z, which is one end in the axial direction of the first pillar 461, and the other ball bearing 471b is provided at the side of the first pillar 461 facing the negative end of the direction Z, which is the other end in the axial direction of the first pillar 461. The same holds true for the second rotary part 472 and the third rotary part 473. The number of ball bearings that form each of the first rotary part 471, the second rotary part 472, and the third rotary part 473 is not limited to two, and may instead be one or three or more.

Specifically, the ball bearings 471a, 472a, and 473a are in contact with the outer circumferential surface 442m of the first portion 442, and the ball bearings 471b, 472b, and 473b are in contact with the outer circumferential surface 443m of the second portion 443. That is, the pair of ball bearings on each of the pillars 461, 462, and 463 are in contact with the outer circumferential surface 44a of the holding part 44 with the ball bearings being separate from each other in the axial direction.

In the present embodiment, since the pair of ball bearings on the pillars 461, 462, and 463 are each in contact with the outer circumferential surface 44a of the holding part 44 at two locations in the axial direction, as shown in FIGS. 3 and 4, radial movement of the holding part 44 during the rotation thereof is satisfactorily restricted. That is, axis runout that may occur when the holding part 44 rotates can be satisfactorily suppressed.

The outer circumferential surface 44a of the holding part 44 has a step 44D in the radial direction. The step 44D in the present embodiment includes a first step 442D provided at the outer circumferential surface 442m and a second step 443D provided at the outer circumferential surface 443m.

The first step 442D is defined by the difference in outer diameter between an outer circumferential surface 442m1, which is located at the side facing the positive end of the direction Z out of the outer circumferential surface 442m, and an outer circumferential surface 442m2, which is located at the side facing the negative end of the direction Z out of the outer circumferential surface 442m. The outer diameter of the outer circumferential surface 442m2 is greater than the outer diameter of the outer circumferential surface 442m1.

The second step 443D is defined by the difference in outer diameter between an outer circumferential surface 443m1 located at the side facing the positive end of the direction Z out of the outer circumferential surface 443m, and an outer circumferential surface 443m2 located at the side facing the negative end of the direction Z out of the outer circumferential surface 443m. The outer diameter of the outer circumferential surface 443m1 is greater than the outer diameter of the outer circumferential surface 443m2.

In the axial direction, the step 44D overlaps with part of the support part 46.

Specifically, the first step 442D is located at a position shifted from the ball bearings 471a, 472a, and 473a toward the negative end of the direction Z, and overlaps therewith in the axial direction.

The second step 443D is located at a position shifted from the ball bearings 471b, 472b, and 473b toward the positive end of the direction Z, and overlaps therewith in the axial direction.

Therefore, the ball bearings 471a, 472a, and 473a restrict the movement of the first step 442D toward the positive end of the direction Z, and the ball bearings 471b, 472b, and 473b restrict the movement of the second step 443D toward the negative end of the direction Z.

In the wavelength conversion apparatus 4 according to the present embodiment, the first rotary part 471, the second rotary part 472, and the third rotary part 473 of the support part 46 restrict the position of the holding part 44 with respect to the substrate 42 in the axial direction. The distance in the axial direction between the light collector 40 held by the holding part 44 and the wavelength converter 41 fixed to the substrate 42 can therefore remain fixed.

In the wavelength conversion apparatus 4 according to the present embodiment, the support part 46 is configured to rotatably support the holding part 44 at a plurality of locations on the outer circumferential surface 44a separate from each other in along the circumferential direction, as described above. In the present embodiment, the support part 46 supports the outer circumferential surface 44a at the plurality of locations to support the holding part 44 in a stable manner, which rotates around the axis of rotation R, and suppress axis runout that occurs when the holding part 44 rotates.

In the case of the wavelength conversion apparatus 4 according to the present embodiment, the fact that the support part 46 rotatably supports the outer circumferential surface 44a at three different locations in the circumferential direction allows use of small-diameter ball bearings that constitute each of the rotary parts 471 to 473 and are in contact with the outer circumferential surface 44a. Rotational resistance of the holding part 44 is therefore reduced, whereby a small, low-power motor can be employed as the driver 452 of the rotary driver 45. The size of the rotary driver 45 can therefore be reduced, and the cost thereof can be lowered.

The second side plate 202 of the light source enclosure 20 includes a protrusion 70, which is provided at an inner surface 202b and surrounds the axis of rotation R, as shown in FIG. 4. The protrusion 70 has the shape of a ring when viewed in the axial direction.

The second portion 443 includes a shield 446, which is provided at an end section 202b on the second side plate 202 side and covers the radial exterior of the protrusion 70. The shield 446 covers the protrusion 70 entirely in the circumferential direction.

The shield 446 of the holding part 44 and the protrusion 70 are disposed with a gap therebetween in the radial direction. The shield 446 and the protrusion 70 are therefore not in contact with each other in the radial direction. In the present embodiment, the shield 446 of the holding part 44 corresponds to a facing section that radially faces the protrusion 70 provided at the second side plate 202.

Furthermore, the shield 446 of the holding part 44 and the inner surface 202b of the second side plate 202 are disposed with a gap therebetween in the axial direction, so that the second side plate 202 does not interfere with the holding part 44 when the holding part 44 rotates.

In the wavelength conversion apparatus 4 according to the present embodiment, the radial exterior of the protrusion 70 provided at the second side plate 202 is covered with the shield 446 of the holding part 44, so that the gap created between the second side plate 202 and the holding part 44 in the radial direction is closed. The holding part 44 thus has a further dustproof interior.

The configuration described above can suppress adhesion of dust to the wavelength converter 41 disposed in the holding part 44 and the light collector 40 facing the wavelength converter 41. Occurrence of problems such as heat generation due to the dust adhesion can therefore be suppressed.

In the wavelength conversion apparatus 4 according to the present embodiment, the protrusion 70 is provided radially inward from the shield 446. The configuration described above allows the outer circumferential surface 44a of the holding part 44 and the support part 46 to be close to each other as compared with a case where the protrusion 70 is provided at a position outside the shield 446 in the radial direction, whereby the configuration of the wavelength conversion apparatus 4 can be reduced in size.

Figure 5:
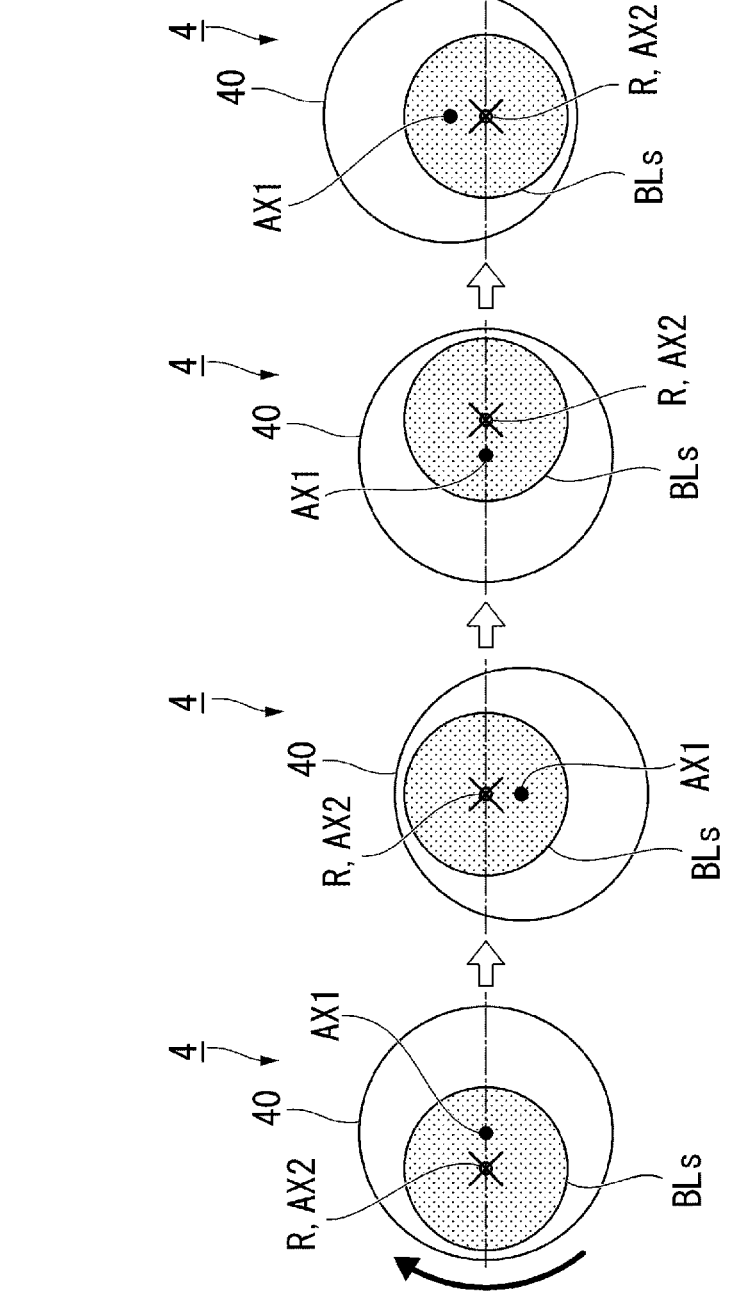
FIG. 5 is a plan view showing the positional relationship among the optical axis of a light collector, the axis of rotation, and the optical axis of beams.

FIG. 5 is a plan view showing the positional relationship among an optical axis AX1 of the light collector 40, the axis of rotation R, and an optical axis AX2 of the beams BLs when viewed in the axial direction. FIG. 5 shows changes in the positional relationship that occur when the holding part 44 is rotated in increments of 90° in the direction indicated by the arrows.

In the wavelength conversion apparatus 4 according to the present embodiment, the axis of rotation R of the holding part 44 intersects with the center of the light incident surface 41*a* of the wavelength converter 41, as shown in FIG. 5. The optical axis AX1 of the light collector 40 and the axis of rotation R of the holding part 44 are separate from each other and parallel to each other. The axis of rotation R of the holding part 44 coincides with the optical axis AX2 of the beams BLs that enter the light collector 40. The focal point of the light collector 40 is therefore present on the optical axis AX1.

When the holding part 44 and the light collector 40 are rotated around the axis of rotation R by the rotary driver 45, the position of the optical axis AX1 of the light collector 40 relative to the axis of rotation R changes. That is, the position of the beams BLs relative to the optical axis AX1 of the light collector 40 changes. A light incident position SP where the beams BLs are incident on the light incident surface 41*a* of the wavelength converter 41 corresponds to the intersection of the light incident surface 41*a* and the optical axis AX1, where the focal point of the light collector 40 is present.

In the present embodiment, the beams BLs fall within the light collector 40, as shown in FIG. 5. That is, the light collector 40 causes the beams BLs to be efficiently incident on the light incident surface 41*a* of the wavelength converter 41.

Figure 6:
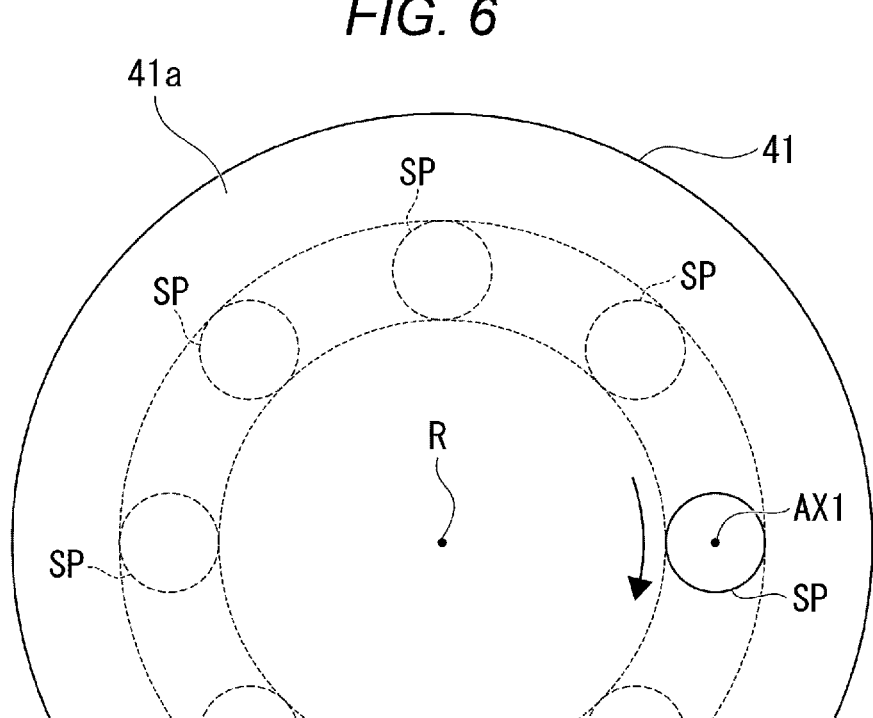
FIG. 6 is a plan view showing the positions where the beams are incident on a light incident surface of the wavelength converter.

FIG. 6 is a plan view showing the positions where the beams BLs are incident on the light incident surface 41*a* of the wavelength converter 41 when viewed in the axial direction.

When the light collector 40 is rotated around the axis of rotation R by the rotary driver 45, the light incident position SP, where the beams BLs are incident on the light incident surface 41*a* of the wavelength converter 41, moves continuously with time along the circumferential direction around the intersection of the axis of rotation R and the light incident surface 41*a*, as shown in FIG. 6. As described above, the configuration in which the light incident position SP, where the beams BLs, which form the excitation light, are incident, continuously changes with time at the light incident surface 41*a* can suppress continuous local incidence of the beams BLs on the light incident surface 41*a*. The situation in which the temperature of the light incident surface 41*a* locally rises can therefore be suppressed, whereby a decrease in the conversion efficiency at which the wavelength converter 41 converts the beams BLs into the fluorescence YL can be suppressed.

The radius of the circle drawn by the light incident position SP of the beams BLs is proportional to the radius of the rotation of the light collector 40, which is defined by the distance between the axis of rotation R and the optical axis AX1.

Increasing the radius of the rotation of the light collector 40 to increase the radius of the circle drawn by the light incident position SP of the beams BLs therefore expands the region over which the beams BLs are incident on the light incident surface 41*a*, whereby a rise in the temperature of the light incident surface 41*a* can be suppressed.

In the wavelength conversion apparatus 4 according to the present embodiment, the optical integration system 31 is so designed that the fluorescence YL emitted from the wavelength converter 41 and parallelized by the light collector 40 can be efficiently captured.

The wavelength conversion apparatus 4 according to the present embodiment, in which the axis of rotation R coincides with the optical axis AX2 as described above, thus allows achievement of a configuration that suppresses both vignetting of the beams BLs that is caused by the light collector 40 and a rise in the temperature at the light incident surface 41*a* of the wavelength converter 41.

As above, the wavelength conversion apparatus 4 according to the present embodiment, in which the rotary driver 45 rotates the holding part 44 and the light collector 40 around the axis of rotation R, allows temporally continuous movement of the light incident position SP of the beams BLs incident on the intersection of the optical axis AX1 of the light collector 40 and the light incident surface 41*a* of the wavelength converter 41. The continuous local incidence of the beams BLs on the wavelength converter 41 can thus be suppressed, whereby the situation in which the temperature of the wavelength converter 41 locally rises can be suppressed. A decrease in the conversion efficiency at which the wavelength converter 41 converts the beams BLs into the fluorescence YL can therefore be suppressed, whereby the efficiency at which the fluorescence YL is extracted from the wavelength converter 41 can be increased.

The projector 1 according to the present embodiment includes the light source apparatus 2, the light modulators 11R, 11G, and 11B, which modulate the light from the light source apparatus 2, and the projection optical apparatus 6, which projects the light modulated by the light modulators 11R, 11G, and 11B.

The projector 1 according to the present embodiment, which includes the light source apparatus 2 including the wavelength converter 41 having increased cooling performance and therefore capable of emitting the illumination light WL containing high-luminance fluorescence YL, can project a bright, high-quality image.

First Variation

The first embodiment has been described with reference to the case where the plurality of rotary parts 471 to 473 form the support part 46, but the support part is not necessarily configured as described above.

Figure 7:
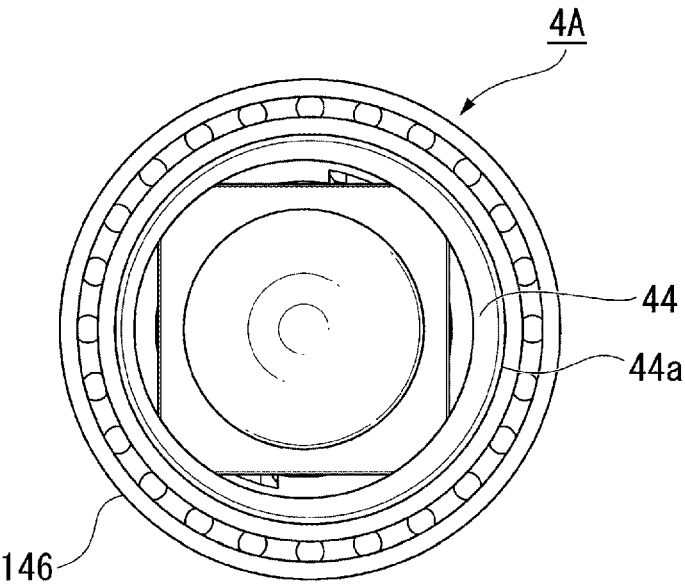
FIG. 7 shows the configuration of key parts of the wavelength conversion apparatus using a support part according to a first variation.

FIG. 7 shows the configuration of key parts of a wavelength conversion apparatus 4A using a support part 146 according to a first variation.

A large ball bearing to which the outer circumferential surface 44*a* of the holding part 44 can be fit may be used as the support part 146, as shown in FIG. 7. The thus configured support part 146 causes an increase in the amount of grease and the rolling resistance of the balls, resulting in an increase in the rotational resistance. In this case, a high-power motor may be used as the driver 452 of the rotary driver 45.

Second Variation

In the first embodiment, the axis of rotation R of the holding part 44 coincides with the optical axis AX2 of the beams BLs as shown in FIG. 5. Instead, a configuration in which the axis of rotation R of the holding part 44 does not coincide with the optical axis AX2 of the beams BLs may be employed.

Figure 8:
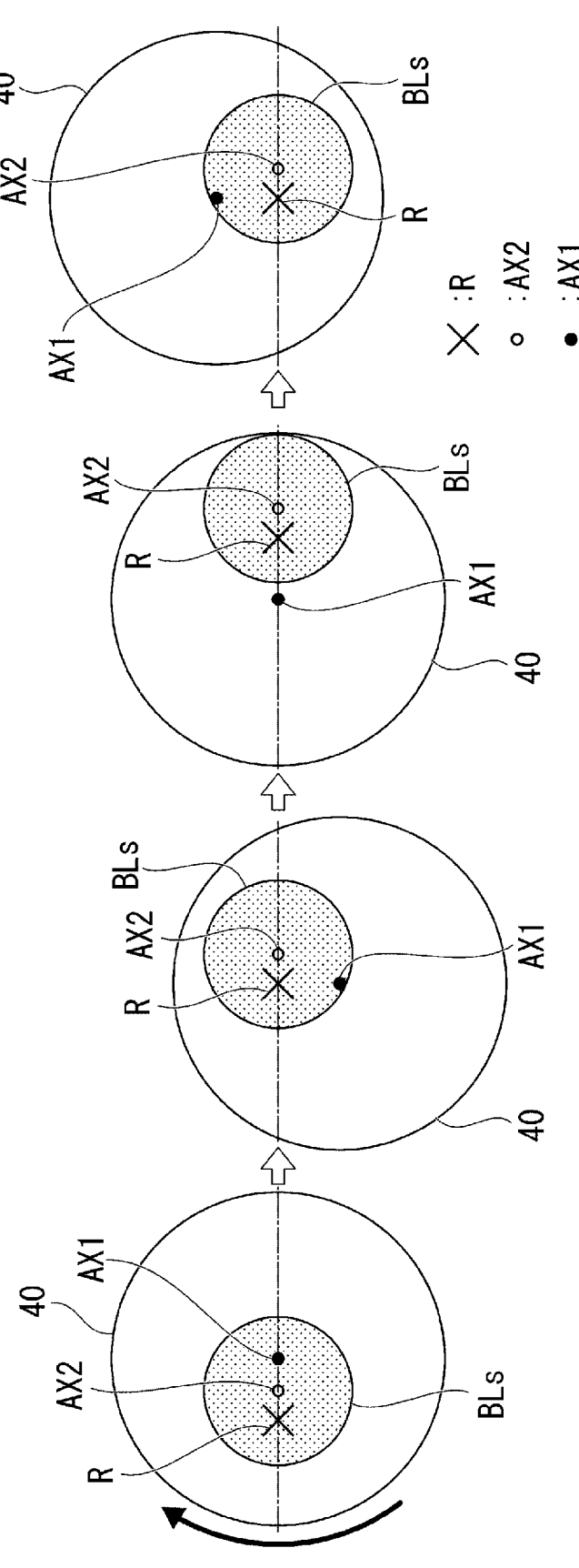
FIG. 8 corresponds to FIG. 5 in a second variation.

FIG. 8 corresponds to FIG. 5 in the second variation.

In the configuration of the present variation, the axis of rotation R and the optical axis AX2 are separate from each other, and the distance between the axis of rotation R and the optical axis AX1 is longer than that in the configuration of the first embodiment, as shown in FIG. 8.

That is, in the present variation, the radius of the rotation of the light collector 40 is longer than that in the configuration of the first embodiment. Therefore, a larger light collector 40 may be prepared to capture the beams BLs more efficiently, as shown in FIG. 8.

In the present variation, since the radius of the rotation of the light collector 40 is greater than that in the configuration of the first embodiment, the light flux width of the fluorescence YL parallelized by the light collector 40 also increases. Increasing the diameter of the first multi-lens array 31a, which constitutes the optical integration system 31, therefore allows the first multi-lens array 31a to capture the entire fluorescence YL.

Third Variation

Figure 9:
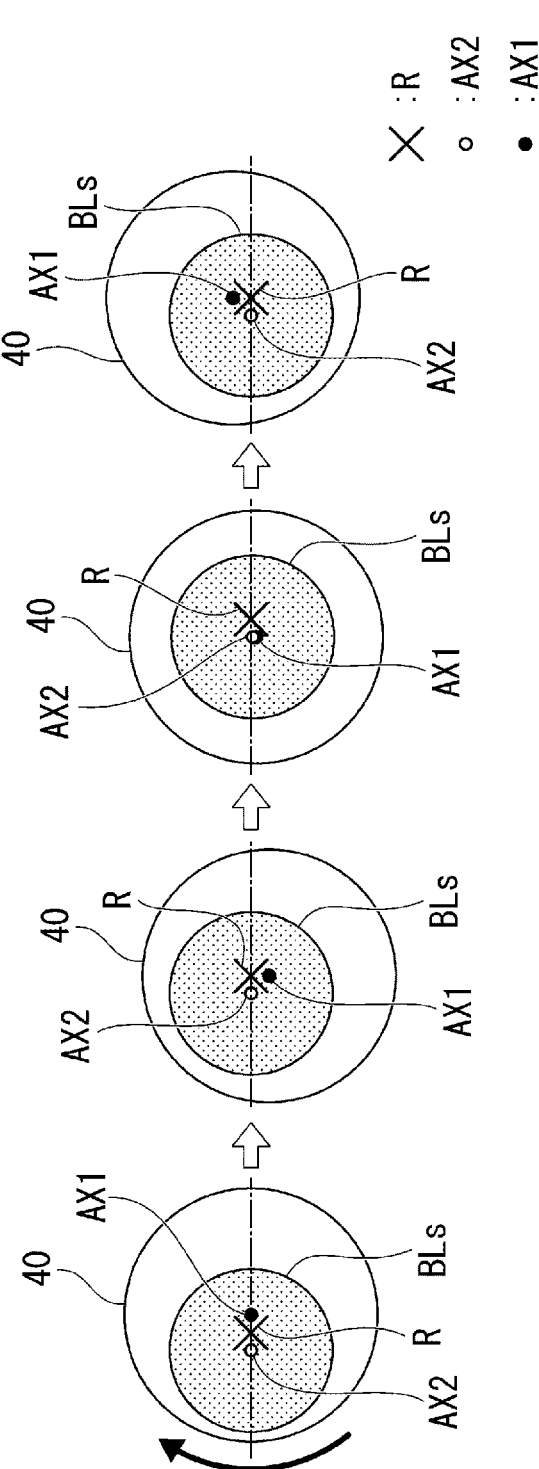
FIG. 9 corresponds to FIG. 5 in a third variation.

FIG. 9 corresponds to FIG. 5 in a third variation.

In the configuration of the present variation, the axis of rotation R and the optical axis AX2 are separate from each other, and the distance between the axis of rotation R and the optical axis AX1 is shorter than that in the configuration of the present embodiment, as shown in FIG. 9.

That is, in the present variation, the distance between the axis of rotation R and the optical axis AX1 is shorter than that in the configuration of the first embodiment. The beams BLs thus fall within the light collector 40, as shown in FIG. 9. In the present variation, since the optical axis AX1 is closer to the axis of rotation R, the radius of rotation of the light incident position SP of the beams BLs on the light incident surface 41a of the wavelength converter 41 becomes smaller. That is, the beams BLs fall within a portion around the intersection of the axis of rotation R and the light incident surface 41a, whereby the size of the wavelength converter 41 can be minimized.

Second Embodiment

The configuration of the light source apparatus according to a second embodiment of the present disclosure will be subsequently described. The present embodiment differs from the first embodiment in terms of the structure of the wavelength conversion apparatus and has otherwise the same configurations. Therefore, in the following description, configurations or parts common to those in the first embodiment have the same reference characters and will not be described in detail.

Figure 10:
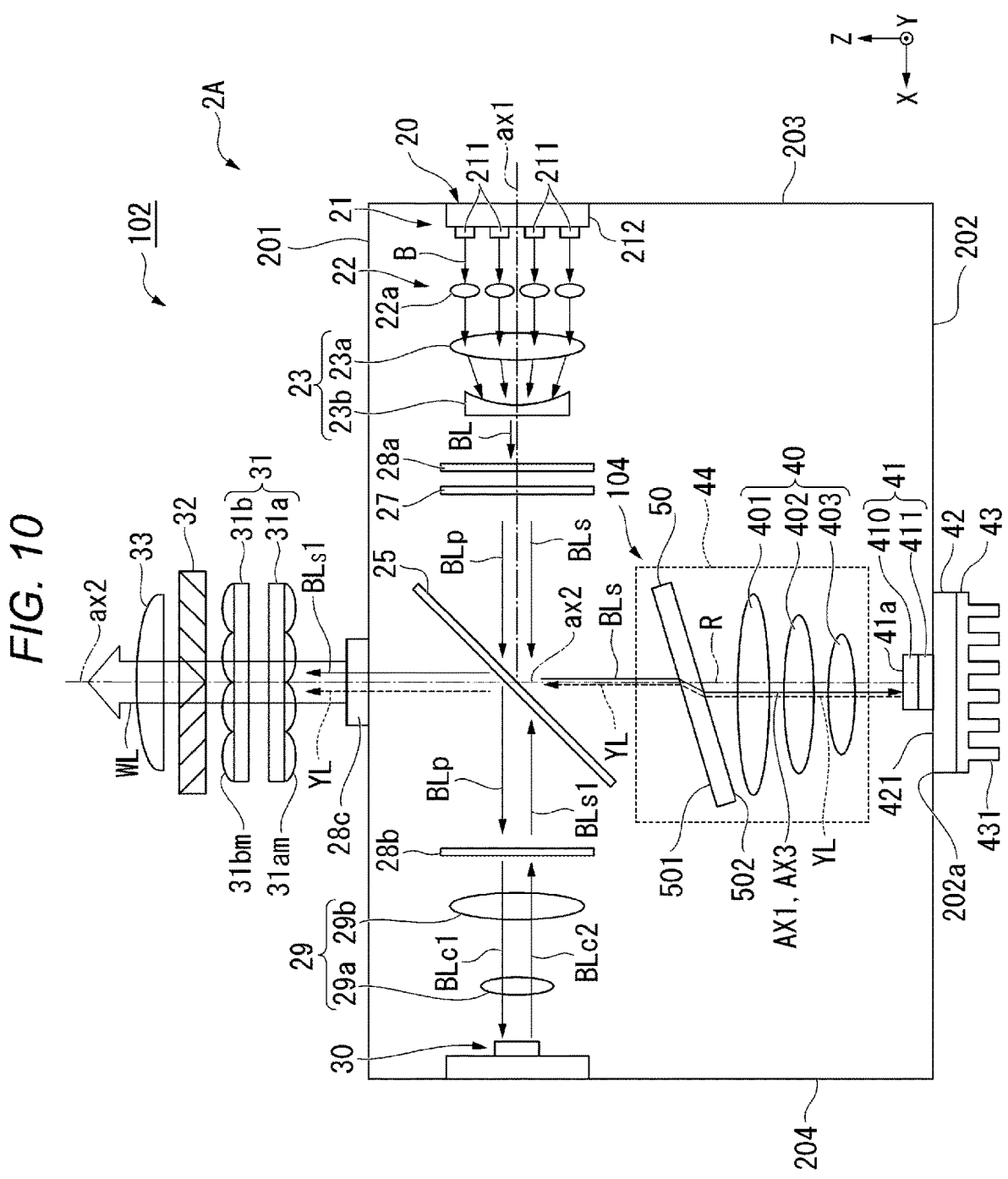
FIG. 10 is a cross-sectional view showing a schematic configuration of the light source apparatus according to a second embodiment.

FIG. 10 is a cross-sectional view showing a schematic configuration of the light source apparatus according to the present embodiment.

A wavelength conversion apparatus 104 of a light source apparatus 102 according to the present embodiment includes an optical element 50, the light collector 40, the wavelength converter 41, the substrate 42, and the heat dissipation part 43, which are sequentially arranged from the side facing the light separator 25, and further includes the holding part 44, the rotary driver 45, and the support part 46, as shown in FIG. 10.

The optical element 50 is disposed at the light input side of the light collector 40. In the present embodiment, the optical element 50 is held by the holding part 44. The holding part 44 therefore makes the optical element 50 along with the light collector 40 rotatable around the axis of rotation R.

The optical element 50 refracts the beams BLs incident from the light separator 25 and causes the refracted beams BLs to exit toward the light collector 40. The optical element 50 further refracts the fluorescence YL incident from the light collector 40 and causes the refracted fluorescence YL to exit toward the light separator 25.

The optical element 50 is a plate-shaped light-transmissive part and is made of glass in the present embodiment. The optical element 50 has a first surface 501 and a second surface 502 located at the side opposite from the first surface 501.

The first surface 501 and the second surface 502 each incline with respect to the plane XY. The first surface 501 and the second surface 502 are parallel to each other. The state in which the first surface 501 and the second surface 502 are parallel to each other includes not only the state in which the two surfaces are perfectly parallel to each other but a state in which the two surfaces are substantially parallel to each other.

The first surface 501 faces the light separator The first surface 501 is the surface on which the beams BLs are incident via the light separator 25. The first surface 501 is also the surface via which the fluorescence YL incident from the light collector 40 exits toward the light separator 25.

The beams BLs having exited out of the light separator 25 along the illumination optical axis ax2 toward the negative end of the direction Z is incident on the first surface 501. The beams BLs incident on the first surface 501 are refracted when the beams BLs enter the optical element 50.

The second surface 502 faces the light collector The second surface 502 is the surface via which the beams BLs having traveled through the optical element 50 exit toward the light collector 40. That is, the second surface 502 is the surface via which the beams BLs incident on the first surface 501 and refracted thereby exit toward the light collector 40 or toward the negative end of the direction Z. The optical axis of the beams BLs having exited via the second surface 502 is hereinafter referred to as an optical axis AX3. That is, the position where the beams BLs exit via the second surface 502 is on the optical axis AX3.

The second surface 502 is the surface on which the fluorescence YL emitted from the wavelength converter 41 is incident. That is, the fluorescence YL having exited out of the light collector 40 toward the positive end of the direction Z is incident on the second surface 502. The fluorescence YL incident on the second surface 502 is refracted when the fluorescence YL enters the optical element 50. The fluorescence YL having traveled in the optical element 50 exits via the first surface 501 toward the light separator 25 or toward the positive end of the direction Z. The fluorescence YL having exited via the first surface 501 toward the positive end of the direction Z travels along the optical path of the beams BLs incident on the first surface 501 in the opposite direction of the direction in which the beams BLs travel.

In the present embodiment, the optical element 50 is so disposed with respect to the light collector 40 that the optical axis AX3 of the beams BLs having exited via the second surface 502 of the optical element 50 coincides with the optical axis AX1 of the light collector 40. The axis of rotation R of the holding part 44 coincides with the optical axis AX2 of the beams BLs incident on the optical element 50.

Figure 11:
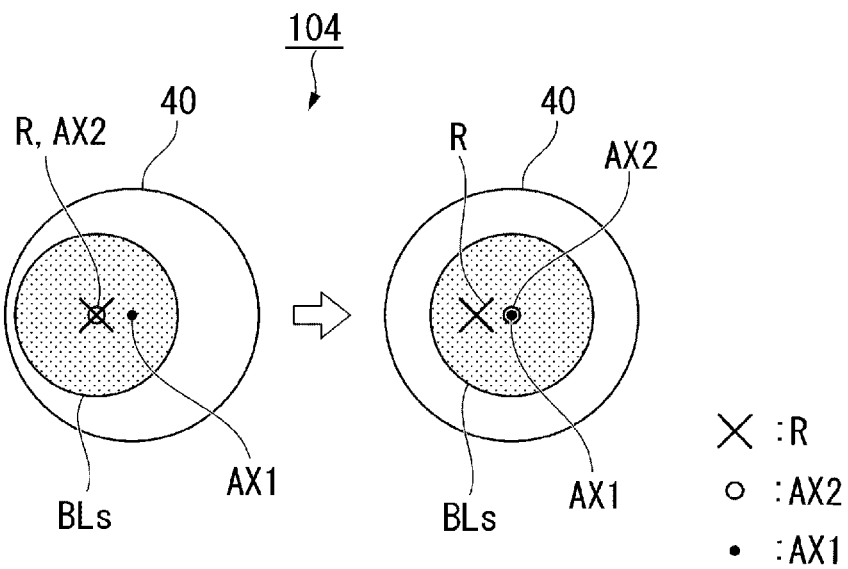
FIG. 11 shows the positional relationship between the axis of rotation and the optical axes in the second embodiment.

FIG. 11 is a plan view showing the positional relationship among the optical axis AX1 of the light collector 40, the axis of rotation R, and the optical axis AX2 of the beams BLs in the wavelength conversion apparatus 104 according to the present embodiment viewed in the axial direction. The left portion of FIG. 11 shows the positional relationship with no optical element 50 provided, and the right portion of FIG. 11 shows the positional relationship in the present embodiment with the optical element 50 provided.

The wavelength conversion apparatus 104 according to the present embodiment, in which the optical axis AX3 of the beams BLs is shifted by the optical element 50, allows the optical axis AX3 to coincide with the optical axis AX1 of the light collector 40, as shown in FIG. 11. Therefore, even when the radius of the rotation of the light collector is increased, the optical axis of the beams BLs can be shifted to allow the beams BLs to enter the light collector That is, an increase in the temperature at the light incident surface 41a can be suppressed by increasing the radius of the rotation of the light collector 40 without a decrease in the efficiency of use of the beams BLs, whereby the efficiency at which the fluorescence YL is extracted from the wavelength converter 41 can be increased.

The technical scope of the present disclosure is not limited to the embodiments described above, and a variety of changes can be made thereto to the extent that the changes do not depart from the intent of the present disclosure.

In addition to the above, the number, arrangement, shape, material, and other specific configurations of the variety of components that constitute the light source apparatus are not limited to those in the embodiments described above and can be changed as appropriate.

The aforementioned embodiments have been described with reference to the case where the first step 442D is located at a position shifted from the ball bearings 471a, 472a, and 473a toward the negative end of the direction Z, and the second step 443D is located at a position shifted from the ball bearings 471b, 472b, and 473b toward the positive end of the direction Z, but not necessarily. For example, the first step 442D may be located at a position shifted from the ball bearings 471a, 472a, and 473a toward the positive end of the direction Z, and the second step 443D may be located at a position shifted from the ball bearings 471b, 472b, and 473b toward the negative end of the direction Z. In this case, the ball bearings 471a, 472a, and 473a restrict movement of the first step 442D toward the negative end of the direction Z, and the ball bearings 471b, 472b, and 473b restrict movement of the second step 443D toward the positive end of the direction Z. As a result, movement of the support part 46 in the axial direction with respect to the substrate 42 can be restricted.

The aforementioned embodiments have been described with reference to the case where the rotary parts 471 to 473 are each formed of a ball bearing. Instead, the rotary parts 471 to 473 may each be formed of a sliding bearing in place of a ball bearing.

The aforementioned embodiments have been described with reference to the case where the rotary driver rotates the first gear 445 to rotate the holding part 44 along with the first gear 445, but not necessarily in the present disclosure. For example, a gear structure may be provided between the rotary parts, which are provided on the first to third pillars rotated by the rotary driver, and the outer circumference surface of the holding part. In this case, for example, the rotary parts are each formed of a gear, and engage with the teeth provided at the outer circumference surface of the holding part, whereby drive power can be transmitted from the rotary driver to the holding part.

In the support part 46 in the embodiments described above, the rotary parts are rotatably provided on the pillars fixed to the second side plate 202, but the support part 46 is not necessarily configured as described above. For example, the support part 46 may be so configured that the pillars are each rotatably fixed to the second side plate 202 and the pillars and the rotary parts integrally rotate relative to the second side plate 202.

In the second embodiment, the first surface 501 of the optical element 50 is assumed to incline with respect to the plane XY, but not necessarily. The first surface of the optical element, the surface on which the beams BLs are incident, may not incline with respect to the plane XY. That is, the optical element only needs to be capable of changing the traveling direction of the beams BLs incident on the first surface and causing the beams BLs to exit in parallel to the axis Z via the second surface.

The first surface 501 and the second surface 502 are assumed to be parallel to each other, but not necessarily. The first surface and the second surface of the optical element may not be parallel to each other.

It is assumed in the embodiments described above that the wavelength converter 41 includes the wavelength conversion layer 410, which converts the beams BLs into the fluorescence YL, and the reflection layer 411, which reflects the light incident from the wavelength conversion layer 410, but not necessarily. The reflection layer 411 may not be provided. In this case, the substrate 42 may be configured to reflect the light incident from the wavelength conversion layer 410. Furthermore, the wavelength converter 41 may be configured to cause the fluorescence YL to exit along the direction in which the beams BLs are incident. That is, the wavelength converter in the present disclosure may be a transmissive wavelength converter.

The embodiments have been described with reference to the case where the first pillar 461, the second pillar 462, and the third pillar 463 are fixed to the second side plate 202 of the light source enclosure 20. Instead, the first pillar 461, the second pillar 462, and the third pillar 463 may be fixed directly to the substrate 42 with the size of the substrate 42 increased. The embodiments have been described with reference to the case where the first pillar 461, the second pillar 462, and the third pillar 463 are provided. Instead, the holding part 44 may be supported by only the first pillar 461 and the second pillar 462.

Figure 12:
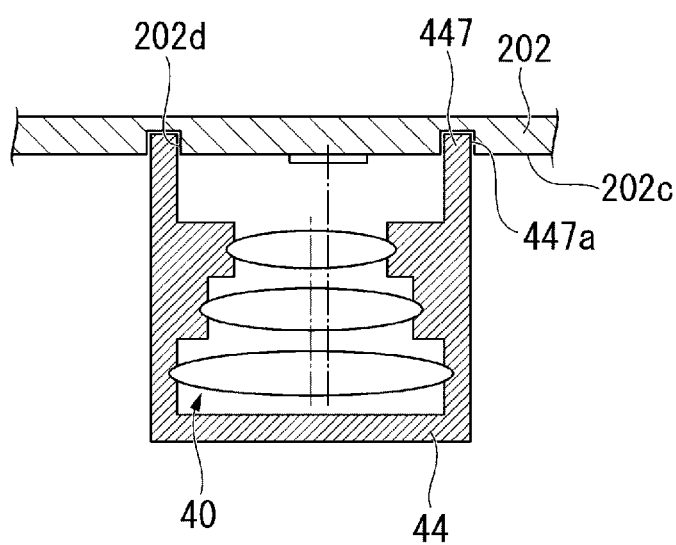
FIG. 12 shows a configuration according to a fourth variation.

In each of the embodiments described above, the protrusion 70, which protrudes from the inner surface 202b of the second side plate 202 toward the holding part 44, and the shield 446 of the holding part 44 face each other in the radial direction, so that the gap created between the second side plate 202 and the holding part 44 in the radial direction is closed, but not necessarily in the present disclosure.
Fourth Variation FIG. 12 shows a configuration according to a fourth variation in which the gap created between the second side plate 202 and the holding part 44 is closed. Note that the configurations of the holding part 44, the light collector 40, and other components are simplified in FIG. 12.

A front end section 447 of the holding part 44 may be inserted into a recess 202d provided at the inner surface 202c of the second side plate 202, so that the front end section 447 of the holding part 44 and the second side plate 202 may face each other in the radial direction, as shown in FIG. 12. In this case, a side surface 447a of the front end section 447 of the holding part 44 corresponds to a facing section that faces the second side plate 202 in the radial direction.

In the embodiments described above, the projector 1 including the three light modulators 11R, 11G, and 11B has been presented by way of example, and the present disclosure is also applicable to a projector that displays color video images via one light modulator. Furthermore, the light modulators are not limited to the liquid crystal panels described above and can instead, for example, be digital mirror devices.

In the embodiments described above, the light source apparatus according to the present disclosure is used in a projector by way of example, but not necessarily. The light source apparatus according to the present disclosure may be used as a lighting apparatus, such as a headlight of an automobile.

The present disclosure will be summarized below as additional remarks.

Additional Remark 1

A wavelength conversion apparatus including a wavelength converter that converts first light that is incident from a light source and belongs to a first wavelength band into second light that belongs to a second wavelength band different from the first wavelength band, a base to which the wavelength converter is fixed, a light collector that causes the first light to enter the wavelength converter, a holding part that holds the light collector, a rotary driver that rotates the holding part around an axis of rotation, and a support part that is fixed to the base and rotatably supports the holding part, in which an optical axis of the light collector and the axis of rotation of the holding part are separate from each other and parallel to each other.

The thus configured wavelength conversion apparatus, in which the rotary driver rotates the holding element and the light collector around the axis of rotation, allows temporally continuous movement of a light incident position where the first light is incident on the intersection of the optical axis of the light collector and the light incident surface of the wavelength converter. Continuous local incidence of the first light on the wavelength converter is thus suppressed, whereby the situation in which the temperature of the wavelength converter locally rises can be suppressed. A decrease in the efficiency at which the wavelength converter converts the first light into the second light can therefore be suppressed, whereby the efficiency at which the second light is extracted from the wavelength converter can be increased.

Additional Remark 2

The wavelength conversion apparatus described in the additional remark 1, in which the support part includes a first pillar fixed to the base, a first rotary part that is provided on the first pillar, is in contact with the holding part, and rotates around the first pillar to rotatably support the holding part, a second pillar fixed to the base at a position different from a position of the first pillar in a circumferential direction around the axis of rotation, and a second rotary part that is provided on the second pillar, is in contact with the holding part, and rotates around the second pillar.

The configuration described above, in which the support part supports the holding part at two locations to support the holding part in a stable manner, can suppress axis runout that occurs when the holding part rotates.

Furthermore, a small ball bearing can be used as each of the rotary parts in contact with the holding part. The rotational resistance of the holding part is thus suppressed, whereby a small, low-power rotary driver can be employed for cost reduction.

Additional Remark 3

The wavelength conversion apparatus described in the additional remark 2, further including a pillar fixing part that fixes a second end section of the first pillar, which is an end section opposite from a first end section fixed to the base, and a fourth end section of the second pillar, which is an end section opposite from a third end section fixed to the base.

According to the configuration described above, end sections of the first and second pillars, the end sections on one side of the axial direction of the pillars that are not fixed to the base, are fixed. The first and second pillars are fixed at opposite end sections thereof in the axial direction so that the rigidity thereof is increased, whereby the first and second pillars can suppress axial runout that occurs when the holding part rotates.

Additional Remark 4

The wavelength conversion apparatus described in any one of the additional remarks 1 to 3, in which the holding part includes a body section that houses the light collector, and a first gear that is provided in the body section and rotates around the axis of rotation, the rotary driver includes a second gear that engages with the first gear and a driver that rotate the second gear, and the body section has a facing surface that faces a gear side surface of the second gear, which is a side surface intersecting with tooth surfaces that engage with the first gear.

The configuration described above, in which the second gear engages with the first gear with the gear side surface of the second gear facing the body section, so that the portion where the second gear engages with the first gear is covered by the body section, suppresses adhesion of dust and other foreign matter. The facing surface restricts the axial position of the second gear, so that deviation of the position of the second gear in the axial direction can be suppressed. The second gear therefore engages with the first gear in a stable manner, whereby the drive power produced by the rotary driver can be efficiently transmitted to the holding part.

Additional Remark 5

The wavelength conversion apparatus described in any one of the additional remarks 1 to 4, in which the holding part includes a facing section at an end section on the base side that faces the base in a radial direction extending from the axis of rotation.

According to the configuration described above, the facing section closes the gap created between the base and the holding part in the radial direction. Dust is therefore unlikely to enter the interior of the holding part. Occurrence of problems such as heat generation due to adhesion of dust to the wavelength converter and the light collector disposed in the holding part can therefore be suppressed.

Additional Remark 6

The wavelength conversion apparatus described in any one of the additional remarks 1 to 5, in which the holding part has an outer circumferential surface in contact with the support part, the outer circumferential surface of the holding part has a step in a radial direction extending from the axis of rotation, and the step and part of the support part overlap with each other in an axial direction along the axis of rotation.

The configuration described above, in which part of the support part and the step overlap with each other in the axial direction, restricts the position of the holding part relative to the base in the axial direction. The distance in the axial direction between the light collector held by the holding part and the wavelength converter fixed to the substrate can therefore remain fixed.

Additional Remark 7

The wavelength conversion apparatus described in any one of the additional remarks 1 to 6, in which the axis of rotation of the holding part coincides with an optical axis of the first light that enters the light collector.

The configuration described above can achieve a configuration that suppresses both vignetting of the first light caused by the light collector and a rise in temperature of the wavelength converter.

Additional Remark 8

A light source apparatus including the wavelength conversion apparatus described in any one of the additional remarks 1 to 7, and a light source that emits the first light.

The thus configured light source apparatus includes the wavelength conversion apparatus having improved second light extraction efficiency, can generate bright illumination light.

Additional Remark 9

A projector including the light source apparatus described in the additional remark 8, a light modulator that modulates light from the light source apparatus, and a projection optical apparatus that projects the light modulated by the light modulator.

The thus configured projector includes the light source apparatus, which generates bright illumination light, can project a bright, high-quality image.

What is claimed is:

1. A wavelength conversion apparatus comprising: a wavelength converter configured to convert a first light into second light, the first light being emitted from a light source, the first light having a first wavelength band, the second light having a second wavelength band different from the first wavelength band; a base to which the wavelength converter is fixed; a light collector configured to have the first light to enter the wavelength converter; a holding part that holds the light collector; a rotary driver configured to rotates the holding part around an axis of rotation; and a support part that is fixed to the base and rotatably supports the holding part, wherein an optical axis of the light collector is separated from the axis of rotation of the holding part, and the optical axis of the light collector is parallel to the axis of rotation of the holding part wherein the support part includes a first pillar fixed to the base, a first rotary part provided on the first pillar and contacting with the holding part, a second pillar fixed to the base at a first position different from a second position to which the first pillar fixed in a circumferential direction around the axis of rotation, a second rotary part provided on the second pillar and contacting with the holding part, the first rotary part rotates around the first pillar to rotatably support the holding part, and the second rotary part rotates around the second pillar.

2. The wavelength conversion apparatus according to claim 1, further comprising
a pillar fixing part that fixes the first pillar and the second pillar, wherein the first pillar has a first end section fixed relative to the base and a second end section that is opposite from the first end section,
the second pillar has a third end section fixed to relative to the base and a fourth end section which opposite from the third end section, and
the pillar fixing part fixes the second end section and the fourth end section.

3. The wavelength conversion apparatus according to claim 1,
wherein the holding part includes
a body section that houses the light collector, and
a first gear that is provided in the body section and rotates around the axis of rotation,
the rotary driver includes a second gear that engages with the first gear and a driver that rotate the second gear, and
the body section has a facing surface that faces a gear side surface of the second gear, which is a side surface intersecting with tooth surfaces that engage with the first gear.

4. The wavelength conversion apparatus according to claim 1,
wherein the holding part includes a facing section at an end section on the base side that faces the base in a radial direction extending from the axis of rotation.

5. The wavelength conversion apparatus according to claim 1,
wherein the holding part has an outer surface in contact with the support part,
the outer surface of the holding part has a step in a radial direction extending from the axis of rotation, and
the step and part of the support part overlap with each other in an axial direction along the axis of rotation.

6. The wavelength conversion apparatus according to claim 1,
wherein the axis of rotation of the holding part coincides with an optical axis of the first light that enters the light collector.

7. A light source apparatus comprising:
the wavelength conversion apparatus according to claim 1; and
a light source that emits the first light.

8. A projector comprising:
the light source apparatus according to claim 7;
a light modulator that modulates light from the light source apparatus; and
a projection optical apparatus that projects the light modulated by the light modulator.

* * * * *